US012726910B2

(12) United States Patent
Redieteab

(10) Patent No.: US 12,726,910 B2
(45) Date of Patent: Sep. 1, 2026

(54) METHOD FOR MANAGING A WIRELESS ACCESS POINT, METHOD FOR TRANSMITTING DATA FROM A STATION TO A WIRELESS ACCESS POINT, CORRESPONDING ACCESS POINT, STATION, AND COMPUTER PROGRAM

(71) Applicant: ORANGE, Issy-les-Moulineaux (FR)

(72) Inventor: Getachew Redieteab, Chatillon Cedex (FR)

(73) Assignee: ORANGE

(*) Notice: Subject to any disclaimer, the term of this patent is extended or adjusted under 35 U.S.C. 154(b) by 564 days.

(21) Appl. No.: 17/926,371

(22) PCT Filed: May 11, 2021

(86) PCT No.: PCT/FR2021/050824
§ 371 (c)(1),
(2) Date: Nov. 18, 2022

(87) PCT Pub. No.: WO2021/234248
PCT Pub. Date: Nov. 25, 2021

(65) Prior Publication Data

US 2023/0180133 A1 Jun. 8, 2023

(30) Foreign Application Priority Data

May 19, 2020 (FR) ...................................... 2005114

(51) Int. Cl.
*H04W 24/08* (2009.01)
*H04W 52/08* (2009.01)
(Continued)

(52) U.S. Cl.
CPC ......... *H04W 52/146* (2013.01); *H04W 52/08* (2013.01); *H04W 52/245* (2013.01); *H04W 52/54* (2013.01)

(58) Field of Classification Search
CPC . H04W 52/146; H04W 52/08; H04W 52/245; H04W 52/54; H04W 52/367;
(Continued)

(56) References Cited

U.S. PATENT DOCUMENTS

2017/0070961 A1* 3/2017 Bharadwaj .......... H04W 52/228
2017/0086147 A1 3/2017 Zhang et al.
(Continued)

FOREIGN PATENT DOCUMENTS

CN 108055880 A 5/2018
CN 108476476 A 8/2018
(Continued)

OTHER PUBLICATIONS

Nokia Corporation et al., "Measurement and measurement reporting of E-UTRAN cells", 3GPP Draft; R2-087129 CR3482 25.331 E-Utra Measurement and Reporting_R1, 3rd Generation Partnership Project (3GPP), Mobile Competence Centre ; 650, Route Des Lucioles ; F-06921 Sophia-Antipolis Cedex ; France, No. Prague, Czech Republic; Nov. 20, 2008, Nov. 20, 2008 (Nov. 20, 2008), XP050321742.

(Continued)

*Primary Examiner* — Nicholas A Jensen
*Assistant Examiner* — Yonghong Zhao
(74) *Attorney, Agent, or Firm* — David D. Brush; Westman, Champlin & Koehler, P.A.

(57) ABSTRACT

A method for managing a wireless access point. The method includes: broadcasting, to a station or stations present in a coverage area of the access point, a downlink frame, the downlink frame carrying an indicator requiring the transmission, by a station receiving the downlink frame, of a received power level of the access point; receiving at least one uplink frame from at least one of the stations, in response to the downlink frame, an uplink frame transmitted (Continued)

by a station carrying information representative of the power level of the access point received by the station; and determining at least one power level of the access point received by at least one of the stations, based on the information representative of the power level carried by the uplink frame or frames.

15 Claims, 3 Drawing Sheets

(51) Int. Cl.
*H04W 52/14* (2009.01)
*H04W 52/24* (2009.01)
*H04W 52/54* (2009.01)

(58) Field of Classification Search
CPC . H04W 24/08; H04W 52/0216; H04W 16/14; H04L 5/0053; H04L 1/0003; H04L 5/0048; H04B 7/024; H04B 7/0452
See application file for complete search history.

(56) References Cited

U.S. PATENT DOCUMENTS

| | | | | |
|---|---|---|---|---|
| 2017/0181102 | A1* | 6/2017 | Bharadwaj | H04W 52/242 |
| 2017/0201995 | A1 | 7/2017 | Rong et al. | |
| 2018/0063736 | A1* | 3/2018 | Sadeghi | H04W 72/0446 |
| 2018/0132278 | A1* | 5/2018 | Oteri | H04L 5/0007 |
| 2019/0306739 | A1* | 10/2019 | Kim | H04W 76/27 |
| 2020/0396694 | A1* | 12/2020 | Comsa | H04W 52/367 |
| 2021/0099962 | A1 | 4/2021 | Bharadwaj et al. | |
| 2021/0352613 | A1* | 11/2021 | Yoon | H04W 56/001 |
| 2021/0410097 | A1* | 12/2021 | Munier | H04L 1/0067 |
| 2022/0174609 | A1* | 6/2022 | Kang | H04W 52/42 |
| 2023/0345380 | A1* | 10/2023 | Lee | H04W 64/00 |

FOREIGN PATENT DOCUMENTS

| | | | |
|---|---|---|---|
| EP | 2693667 | A1 | 2/2014 |
| EP | 3232706 | A1 | 10/2017 |
| WO | 2016077701 | A1 | 5/2016 |

OTHER PUBLICATIONS

English translation of the Written Opinion of the International Searching Authority dated Sep. 9, 2021 for corresponding International Application No. PCT/FR2021/050824, filed May 11, 2021.

IEEE 802.11ax / D6.0 standard, “Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN”, Nov. 2019.

Khorov E. et al., “Current Status and Directions of IEEE 802.11be, the Future Wi-Fi 7”, IEEE Access, Digital Object Identifier 10.1109/ACCESS.2020.2993448, Apr. 15, 2020.

European Notification under Article 94(3) EPC dated Jan. 3, 2025 for corresponding European Application No. 21731259.4.

“3GPP TSG RAN WG2 meeting #89bis, Discussion on Uplink Transmission in LAA,” R2-151383, Bratislava, Slovakia, Apr. 20-24, 2015, Agenda Item: 7.1.3, XP50953065A.

International Search Report dated Sep. 1, 2021 for corresponding International Application No. PCT/FR2021/050824, filed May 11, 2021.

Written Opinion of the International Searching Authority dated Sep. 1, 2021 for corresponding International Application No. PCT/FR2021/050824, filed May 11, 2021.

Chinese Office Action dated Jul. 5, 2025 for corresponding Chinese Application No. 202180044291.2.

* cited by examiner

AP
TRIGGER
STA 1
Cod. RSSI 1
STA 2
Cod. RSSI 1
STA 3
Cod. RSSI 2
STA 4
Cod. RSSI 4

METHOD FOR MANAGING A WIRELESS ACCESS POINT, METHOD FOR TRANSMITTING DATA FROM A STATION TO A WIRELESS ACCESS POINT, CORRESPONDING ACCESS POINT, STATION, AND COMPUTER PROGRAM

CROSS-REFERENCE TO RELATED APPLICATIONS

This Application is a Section 371 National Stage Application of International Application No. PCT/FR2021/050824, filed May 11, 2021, which is incorporated by reference in its entirety and published as WO 2021/234248 A1 on Nov. 25, 2021, not in English.

FIELD OF THE INVENTION

The field of the invention is that of wireless communications.

More specifically, the invention relates to wireless communication networks in infrastructure mode, implementing at least one access point and at least one station, and proposes a solution for managing in particular the transmission power of the access point(s).

The invention relates in particular to wireless communication networks compatible with the IEEE 802.11 standard according to its different current or future versions, more commonly called Wi-Fi networks for "Wireless Fidelity". In particular, the invention relates to Wi-Fi networks according to the IEEE 802.11ax or IEEE 802.11be standard.

PRIOR ART

As illustrated in FIG. 1, a Wi-Fi network in infrastructure mode comprises at least one access point 11 (AP) and at least one station located in the coverage area of the access point.

The access point 11 and the stations located in the coverage area (STA1 121, STA2 122, STA3 123 and STA4 124) thereof form a basic service set (BSS), associated with a communications cell. In infrastructure mode, the access point 11 can be considered as the central point of the cell, because apart from a few exceptional uses, the communications with the stations located in its coverage area all pass through this access point. The coverage area of the access point therefore defines the size of the cell, and therefore the range of the network.

Thus, in order to obtain a large cell size, or to guarantee that the stations desired to be added to the network are within range of the access point, the transmission power of the access point can be quite high. For example, in Europe, the maximum equivalent isotropic radiated power (EIRP) in the low 5 GHz Wi-Fi band (i.e. 5150-5350 MHz) is 23 dBm. The transmission power of the access point can therefore approach this value.

The use of a high transmission power for the downlink communications (i.e. from the access point to the stations) also allow improving the signal-to-noise ratio at the stations which are not at the coverage limit, which allows in particular the use of high-order modulations for communications.

The counterpart is that the power consumption of the access point becomes non-negligible in the long term. In addition, in home Wi-Fi networks in particular, the stations are generally located in the vicinity of the access point (for example in the same room or in an adjoining room).

Thus, it does not always seem appropriate to use a high transmission power for the access point, especially in home Wi-Fi networks.

Solutions have been proposed, but these solutions are expensive in terms of channel access and/or are sensitive to collisions.

There is therefore a need for a new technique allowing managing, among others, the transmission power of the wireless access points.

DISCLOSURE OF THE INVENTION

The invention is based on a new method for managing a wireless access point, comprising:

broadcasting, to one or more stations present in the coverage area of the access point, a downlink frame, said downlink frame carrying an indicator requiring the transmission, by a station receiving said downlink frame, of a received power level of the access point, receiving at least one uplink frame from at least one of said stations, in response to said downlink frame, an uplink frame transmitted by a station carrying information representative of the power level of the access point received by said station, determining at least one power level of the access point received by at least one of said stations, based on said information representative of the power level carried by said uplink frame(s).

Such a process, implemented by an access point, allows in particular estimating the power of the access point, as received by a station, and feeding back this information to the access point.

More specifically, according to this embodiment, the access point broadcasts a particular frame to the stations present in the coverage area thereof. The reception of such a downlink frame by a station allows in particular triggering the estimation of the power of the received downlink frame, and therefore estimating the power level of the access point. Information representative of this power level can then be fed back from the station to the access point, then processed by the access point.

It should also be noted that several power levels, i.e. power ranges, can be defined, each associated with information representative of the power level. Thus, several power values can be associated with the same power level, and therefore encoded by the same information representative of the power level.

In particular, the access point can receive, simultaneously or with a slight shift, several uplink frames from separate stations, and determine the power level associated with each of the distinct stations from the information representative of the power level carried by each uplink frame.

According to one embodiment, the method comprises an update of the transmission power of said access point taking into account said determination.

In this manner, the access point can adjust its transmission power. In particular, the access point can lower its transmission power without the network stations being affected in terms of performance, which allows reducing the power consumption of the access point. Adjusting the transmission power also allows reducing interference between neighbouring networks.

According to a particular embodiment, the downlink frame is a dedicated frame triggering, upon reception by a station, the feedback of information in an uplink frame.

In this case, the indicator is for example a specific frame type or format.

According to another embodiment, the downlink frame is an uplink resource allocation frame.

Such a resource allocation frame, also called control frame, is conventionally broadcast by the access point to indicate, to the different stations of the network, the resources (for example the preamble) to be used to feed back information in an uplink frame. It can in particular carry scheduling information allowing a simultaneous feedback of information from the different stations (resources allocated to the stations, modulation schemes and coding to be used by each station, etc.).

For example, such an uplink resource allocation frame is a "Trigger" frame, as defined in the IEEE 802.11ax standard.

According to a first exemplary embodiment, said indicator is inserted into a "Trigger Type" field of the uplink resource allocation frame.

In this case, the access point transmits a variant of the "Trigger" frame. For example, the value of the indicator inserted in the "Trigger Type" field is comprised between 8 and 15, the values 0 to 7 being already reserved to identify the basic "Trigger" frame and other variants.

According to a second exemplary embodiment, the indicator is inserted into an "Association ID" field of the uplink resource allocation frame.

In this case, the access point transmits a specific identifier, for example a value or a set of values.

This second example allows in particular keeping the structure of the "Trigger" frame as currently defined in the IEEE 802.11ax standard.

According to at least one embodiment, the downlink frame carries at least one information item belonging to the group comprising:

- a maximum power, below which a station must feed back a received power level to the access point,
- a family of at least one sequence to be used by a station to feed back a power level,
- a number of authorised cyclic shifts for a sequence to be used by a station to feed back a power level,
- a set of at least one position-value pair to be used by a station to feed back a power level.

Thus, according to a first example, only the stations receiving the downlink frame with a power lower than a determined threshold (maximum power) may have to feed back the received power level.

According to a second example, the access point can transmit in the downlink frame a family comprising at least one sequence, each sequence being associated with a distinct power level. In particular, the different sequences of a family may have been obtained by applying a cyclic shift to a reference sequence from the family of sequences. In this case, different cyclic shifts of the reference sequence are associated with different power levels.

According to another example, the access point can transmit in the downlink frame a number of authorised cyclic shifts for a reference sequence, which can be known to the stations or transmitted in the sequence family of the downlink frame.

According to yet another example, the access point can transmit in the downlink frame a set of position-value pairs to be used by a station to feed back a power level, each position-value pair being associated with a distinct power level. For example, the position of a position-value pair corresponds to (or allows identifying) the index of a subcarrier to be used by a station to feed back a power level, and the value of a position-value pair corresponds to the value associated with the constellation point to be transmitted on the subcarrier thus identified.

In particular, as already indicated, several power values of the access point, as estimated by the stations, can be associated with the same power level, and therefore encoded by the same information representative of the power level. Thus, it is possible to broadcast, in the downlink frame, a restricted number of sequences or position-value pairs to be used (or even a restricted number of cyclic shifts), where each sequence or position-value pair encodes a larger range of power values, which allows reducing the granularity of the information feedback.

It is also possible to broadcast, in the downlink frame, a restricted number of sequences or position-value pairs to be used (or even a restricted number of cyclic shifts), where each sequence or position-value pair encodes a range of power values whose maximum value is less than a determined threshold (maximum power). The list could thus be restricted to the sequences or position-value pairs encoding the lowest powers (that is to say, in general, the stations furthest from the access point and therefore the most impacted by a reduction in transmission power of the access point).

It is moreover possible to reduce the number of sequences or pairs to be identified on the access point side, for example by retaining only the sequences or pairs encoding a low power level for the determination step implemented by the access point. This allows, for example, gaining in reactivity, complexity and/or power consumption.

In other embodiments, this information (for example of the maximum power type, family of sequences, number of authorised cyclic shifts, set of position-value pairs, etc.) is not transmitted in the downlink frame, but known to the access point and stations. For example, this information is defined in a standard.

According to a particular embodiment, the downlink frame is broadcast periodically or following a triggering event belonging to the group comprising:

- sending at least one beacon by the access point,
- associating at least one new station with said access point,
- detecting a neighbouring access point,
- detecting the mobility of at least one station.

Repeating the broadcast of such a downlink frame allows in particular ensuring that the greatest number of stations receives information from the access point, at a sufficient power.

According to a particular embodiment, called embodiment with family of sequences, the determination implements, for at least one sequence of a family of at least one sequence known to said access point, a correlation between said sequence and said at least one upstream frame.

According to this embodiment, the information representative of the power level is a sequence selected from a family of sequences known to the access point. A correlation is therefore performed between a sequence of the access point and the received uplink frame(s), so as to identify the sequence carried by each uplink frame. In other words, a correlation is performed between the information representative of the power level, carried by the uplink frame, and the different sequences from the family known to the access point.

For example, when the family of sequences includes a reference sequence and shifted versions of this reference sequence, the determination step implements a sliding correlation.

The detection of a correlation peak allows identifying the sequence transmitted in the uplink frame, and determining the associated power level.

It is noted that several uplink frames can be received simultaneously by the access point, or with a shift in the range of a few microseconds. In this case, it is possible to correlate the combination of the sequences associated with each received uplink frame, with at least one sequence from the family of sequences known to the access point.

According to another embodiment, called embodiment with bitmap, the determination implements, for at least one position-value pair of a set of at least one position-value pair known to said access point:

- obtaining a value associated with the position of said position-value pair in said at least one uplink frame,
- comparing said obtained value with a determined threshold.

According to this embodiment, the information representative of the power level is a position-value pair selected from a set of position-value known to the access point.

Upon reception of an uplink frame, the access point obtains a value of the uplink frame associated with a position of the position-value pair known to the access point (for example the value associated with the constellation point transmitted on the subcarrier whose index corresponds to the position of the pair (position, value)), and, if this value is greater than a determined threshold, can obtain the power level associated with this position-value pair. In particular, such a threshold can be determined from the value of the position-value pair.

Again, several uplink frames can be received simultaneously by the access point, or with a shift in the range of a few microseconds.

In another embodiment, the invention relates to a corresponding access point.

Such an access point is in particular adapted to implement the management method described above. This is for example a set-top box or a home gateway. Such an access point could in particular include the different characteristics relating to the management method according to the invention, which may be combined or taken separately. Thus, the characteristics and advantages of this access point are the same as those of the management method, and they are not further detailed.

The invention moreover relates to a method for transmitting data from a station to a wireless access point, comprising:

- receiving, by said station, a downlink frame from said access point,
- detecting, in said downlink frame, an indicator requiring the transmission of the power level of the access point received by said station,
- estimating the power of said downlink frame received by said station,
- transmitting, to said access point, an uplink frame carrying information representative of a power level associated with the estimated power.

Such a method, implemented by one or more stations in the coverage area of the access point, allows in particular feeding back, from the station to the access point, information on the power of the downlink frame received by the station.

In other words, the reception of such a downlink frame at a station allows in particular triggering the estimation of the power of the received downlink frame, and therefore estimating the power level of the access point. Information representative of this power level can then be fed back from the station to the access point.

This information can in particular be used by the access point to adjust its transmission power.

It is noted that such a station can be associated or not associated with the access point.

According to a first embodiment, called embodiment with family of sequences, the information representative of the power level is a sequence of a family of at least one sequence known to the access point, each sequence of said family being associated with a distinct power level.

For example, a family is selected comprising distinct sequences, having good inter-correlation and/or autocorrelation properties, or comprising a reference sequence and shifted versions of this reference sequence. By way of example, the family of sequences comprises the Zadoff-Chu sequences.

In particular, the complex symbols forming said sequence are mapped onto the points of a constellation associated with the modulation used for the transmission of said uplink frame.

A transmission of the sequence in the frequency domain, rather than in the time domain, allows simplifying the detection of the sequence in the uplink frame received by the access point, by performing a simple correlation. In addition, it is thus possible to use modules which are conventionally implemented in transmission and reception chains.

In another particular embodiment, called embodiment with bitmap, the information representative of the power level is a position-value pair of a set of at least one position-value pair known to said access point, each position-value pair of said set being associated with a distinct power level.

In particular, the value of said position-value pair is mapped onto a point of a constellation associated with the modulation used for the transmission of said uplink frame, said constellation point being transmitted on a subcarrier identified from the position of said position-value pair.

For example, a position-value pair can be represented by a vector encoding a power level. Such a vector carries a component equal to the value of the position-value pair (for example '1') at the position identified by the position of the position pair, and zero components at the other positions. For transmission, it is possible to map the zero components onto constellation points with a low amplitude negative in-phase component, and the non-zero component onto a constellation point with a high amplitude positive in-phase component, then transmit each constellation point on a separate subcarrier.

In particular, in an OFDM symbol, a set of subcarriers can be reserved for the transmission of such a vector. The different components of the vector can thus be mapped onto different constellation points, each transmitted on a subcarrier from the reserved subcarriers. For example, the first component of the vector is transmitted on the first reserved subcarrier (i.e. the subcarrier having the smallest index), the second component of the vector is transmitted on the second reserved subcarrier (i.e. the subcarrier having the second smallest index), etc.

The reserved subcarriers can be known, or identified in the uplink frame. In particular, these subcarriers are distributed in the OFDM symbol, so as to retain the properties of the OFDM symbol and limit the crest factor ("Peak to average power ratio", or PAPR).

Again, transmission in the frequency domain allows simplifying the detection of the position-value pair in the uplink frame received by the access point. In addition, it is thus possible to use modules which are conventionally implemented in transmission and reception chains.

According to another particular embodiment, the information representative of a power level is repeated over several consecutive OFDM symbols.

Such repetition of the sequence or the position-value pair allows increasing the probability of detection of the sequence or the position-value pair in the uplink frame(s) received by the access point.

According to a particular embodiment, the uplink frame is transmitted on a resource shared by at least one other station transmitting the same information representative of said power level.

According to another embodiment, the uplink frame is transmitted over a resource shared by at least one other station associated with said access point.

In other words, it is possible to constitute groups by band (or resource units, RU) instead of allocating the entire band to all stations. For example, one group is defined per power level, and each station determines to which group it belongs depending on the estimated power. According to another example, a group is defined with the stations associated with the access point, and a group with the stations which are not associated with the access point.

According to a particular embodiment, the method for transmitting data from a station to an access point comprises the reception of an uplink frame from at least one other station, and the re-transmission of this uplink frame to said access point.

In other words, a station can be used as a relay for another station.

In another embodiment, the invention relates to a corresponding station.

Such a station is in particular adapted to implement the previously described transmission method. It is for example a sensor, a printer, a smartphone, a computer, etc., or more generally a client terminal. Such a station could in particular include the different characteristics relating to the transmission method according to the invention, which may be combined or taken separately. Thus, the characteristics and advantages of this station are the same as those of the transmission method, and they are not further detailed.

In another embodiment, the invention relates to one or more computer programs including instructions for implementing a method for managing an access point and/or a method for transmitting data from a station to an access point, according to at least one embodiment of the invention, when this or these programs is/are executed by a processor.

In yet another embodiment, the invention relates to one or more information carriers which are non-removable, or partially or totally removable, readable by a computer, and including instructions of one or more computer programs for the execution of the steps of a method for managing an access point and/or a method for transmitting data from a station to an access point, according to at least one embodiment of the invention.

The methods according to the invention can therefore be implemented in different manners, in particular in wired form and/or in software form.

LIST OF FIGURES

Other features and advantages of the invention will appear more clearly on reading the following description of a particular embodiment, given by way of a simple illustrative and non-limiting example, and the appended drawings, among which:

DESCRIPTION OF AN EMBODIMENT

5.1 General Principle

The general principle of the invention is based on the broadcasting of a downlink frame, from an access point to the stations present in the coverage area of the access point, triggering the feedback of information on the power of the downlink frame as received by each station.

In this manner, the access point can establish a map of the received powers (for example in number of stations per power level), and adjust its transmission power.

Figures 2, 4:
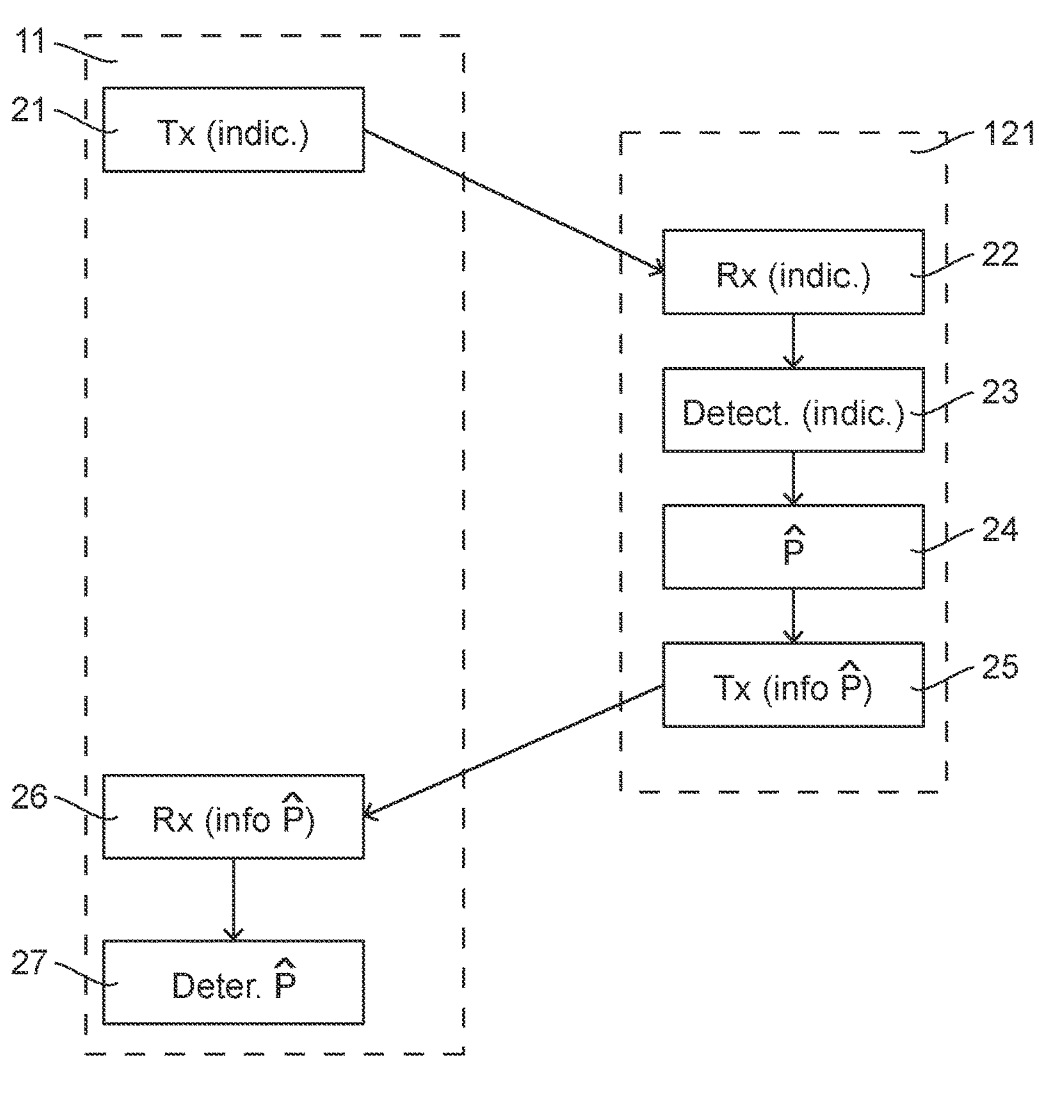
FIG. 2 shows the main steps of a method for managing a wireless access point and a method for transmitting data from a station to an access point, according to at least one embodiment of the invention.
FIG. 4 shows an example of frames exchanged between an access point and stations.

In relation to FIG. 2, the main steps implemented by an access point and at least one station present in the coverage area of the access point are shown according to a particular embodiment.

Figure 1:
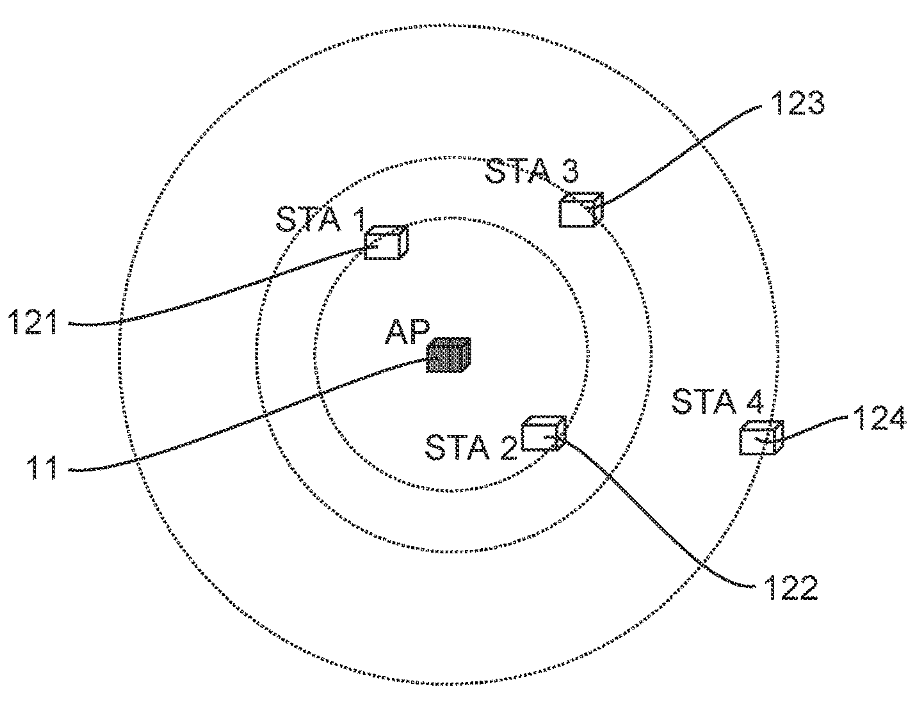
FIG. 1 illustrates an example of a wireless network implementing an access point and several stations.

By way of example, a Wi-Fi network is considered as illustrated in FIG. 1, comprising an access point AP 11 and four stations STA1 121, STA2 122, STA3 123 and STA4 124.

The access point 11 broadcasts (21) a downlink frame carrying an indicator requiring the transmission, by a station receiving the downlink frame, of a received power level of the access point.

Such a downlink frame can be received by all stations present in the coverage area of the access point, whether they are associated or not associated with the access point, for example the stations STA1 121, STA2 122, STA3 123 and STA4 124.

The steps implemented by the first station STA1 121 are shown below. Similar steps can be implemented by the other stations STA2 122, STA3 123 and STA4 124.

The first station STA1 121 receives (22) the downlink frame broadcast by the access point and detects (23) an indicator requesting the transmission of the power level of the access point received by the station. Such an indicator can be the format of the frame, the type of the frame, a particular identifier, etc.

The first station STA1 121 estimates (24), in a conventional manner, the power of the downlink frame as received by the station, and therefore the power of the access point. The first station thus obtains, for example, a received signal strength indicator (RSSI).

This estimated power can then be fed back to the access point 11.

For example, the first station STA1 121 identifies a power level to which the estimated power belongs, and transmits (25) to the access point 11 an uplink frame carrying information representative of the power level associated with the estimated power.

Different "granularities" of the power levels can be defined: for example, a power level can be defined per power, or a power level for a range of powers. For example:

- a first power level is associated with a power comprised in the interval [Smax; −30 dBm],
- a second power level is associated with a power within the interval [−30 dBm; −60 dBm], and
- a third power level is associated with a power within the interval [−60 dBm; Smin], with Smax and Smin the maximum and minimum sensitivity levels of the station receiver. For example, Smax is equal to 0 dBm and Smin is equal to −110 dBm.

The information representative of the power level associated with the estimated power therefore allows "encoding" the power level. A correspondence table between the power level and the information representative of the power level can in particular be previously known to the access point and the stations (for example defined in a standard), or transmitted by the access point in the downlink frame or in another frame.

The access point 11 therefore receives (26) an uplink frame from the first station STA1 121, and possibly other uplink frames from the other stations STA2 122, STA3 123 and STA4 124, in response to the downlink frame previously broadcast by the access point.

The access point can then determine (27) its power level as received by the first station STA1 121, and possibly the other stations STA2 122, STA3 123 and STA4 124, from the information representative of the power level carried by each uplink frame.

The access point 11 can use the obtained power levels to create a map of the power levels, adjust its transmission power, etc.

In particular, it is noted that the use of information representative of a power level, in the uplink frames, allows "encoding" the power level associated with each station (power level of the access point as received by each station). Thus, when several stations simultaneously feed back the received power level of the access point, it is possible for the access point to find the power levels associated with each station, despite the collision of the uplink frames. In addition, both associated stations and non-associated stations can participate in this information feedback.

5.2 Examples of Generation of a Downlink Frame

As indicated above, the access point 11 broadcasts (21) a downlink frame carrying an indicator requiring the transmission of a received power level of the access point by a station receiving the downlink frame.

According to a first embodiment, such a downlink frame is a frame dedicated to triggering an information feedback.

According to a second embodiment, such a downlink frame is an uplink resource allocation frame, for example the "Trigger" frame according to the IEEE 802.11ax standard or the variants thereof.

In this case, the indicator requesting the transmission of a received power level of the access point can be a frame type. If the "Trigger" frame is considered, such an indicator can be inserted in the "Trigger Type" field of the Common Information field of the "Trigger" frame, so as to define a particular variant of the "Trigger" frame.

By way of example, the table 9-31b of the IEEE 802.11ax/D6.0 standard of November 2019 has already defined several variants for the "Trigger" frame: conventional "Trigger" frame if the "Trigger Type" field is equal to 0 ("Basic"), variant of the "Trigger" frame of "BFRP" type if the "Trigger Type" field is equal to 1 ("beamforming report poll"), variant of the "Trigger" frame of the "MU-BAR" type if the "Trigger Type" field is equal to 2 ("Multi-user block ack request"), etc.

Thus, it is possible to define a new type of uplink resource allocation frame to trigger the feedback of the power information received on the station side.

Alternatively, it is possible to allocate, in the downlink frame, a particular identifier to which the stations present in the coverage area of the access point can respond.

For example, if the "Trigger" frame is considered, the indicator requiring the transmission of a received power level of the access point can be an identifier taking the form of a value or a set of values, inserted in the "Association ID" (or AID) field of the user information field of the "Trigger" frame.

It is noted that the use of the "Trigger" frame allows in particular implementing a multiple access technique of the OFDMA ("Orthogonal Frequency Division Multiple Access") type in uplink, also denoted UL OFDMA. In this manner, the different stations receiving the downlink frame can feed back simultaneously (or substantially simultaneously) the received power information by using such a multiple access technique. Thus, this ensures a restricted channel occupancy footprint for this power information feedback phase, which allows for example an implementation at a higher frequency.

5.3 Examples of Generation of an Uplink Frame

As indicated above, the reception by at least one station of a downlink frame according to the invention triggers the estimation (24) of the power of the downlink frame as received by the station, then the feedback (25) to the access point of an uplink frame carrying information representative of the power level associated with the estimated power.

Two types of information representative of a power level that can be used to encode the power level associated with a station, for example the first station STA1 121, are presented below. A similar encoding can be performed to encode the power levels associated with the other stations STA2 122, STA3 123 and STA4 124.

According to a first embodiment, called embodiment with family of sequences, the information representative of a power level is a sequence. A family of at least one sequence previously known to the access point and the stations, or transmitted from the access point to the stations (for example in the downlink frame or in another frame) is thus considered, and a power level is associated with each sequence of the family, for example in a correspondence table known to the access point and the stations, or transmitted from the access point to the stations (for example in the downlink frame or in another frame).

Such a family of sequences can be composed of distinct sequences, each sequence being associated with a distinct power level. Alternatively, a family of sequences can be composed of a sequence, called the reference sequence, and shifted versions of this reference sequence (i.e. of the reference sequence to which a cyclic shift is applied), each shifted version being associated with a distinct power level. According to this variant, it is considered that the reference sequence is known to the access point and the stations, or transmitted from the access point to the stations (for example in the downlink frame or in another frame). Likewise, a number of authorised cyclic shifts can be known to the access point and the stations, or transmitted from the access point to the stations (for example in the downlink frame or in another frame).

According to this first example, the different sequences of the family (distinct sequences or reference sequence and shifted version) have good autocorrelation and/or inter-correlation properties. For example, the sequences of a family are the Zadoff-Chu sequences with a cyclic shift which is large enough to guarantee a very low inter-correlation.

Thus, when the access point receives one or more uplink frames from one or more stations, it does not seek to decode each signal to extract the information therefrom (solution which is fragile to collisions), but to identify the presence of at least one sequence for each power level, by performing a correlation between the signal that it receives and the different sequences that it knows. The detection of a correlation peak for a given sequence thus allows identifying the power level of the access point received by a station. In other words, the correlation properties of the family of sequences allow discriminating the presence of each sequence and therefore of the corresponding power level.

The possible collisions between the uplink frames transmitted by the different stations are not a problem, because the inter-correlation and/or autocorrelation properties of the used family of sequences allows distinguishing one sequence from another.

For each uplink frame, the sequence encoding the power level associated with the station can be transmitted in the time domain.

Alternatively, the sequence encoding the power level associated with the station may be transmitted in the frequency domain. In this manner, it is possible to make the correlation in baseband, and therefore take advantage of the access point processor.

For example, the sequence encoding the power level associated with a station can be transmitted on a selection of constellation points of the constellation diagram associated with the modulation used for the transmission of the uplink frame (for example 16-QAM, 64-QAM, etc.).

Figure 3:
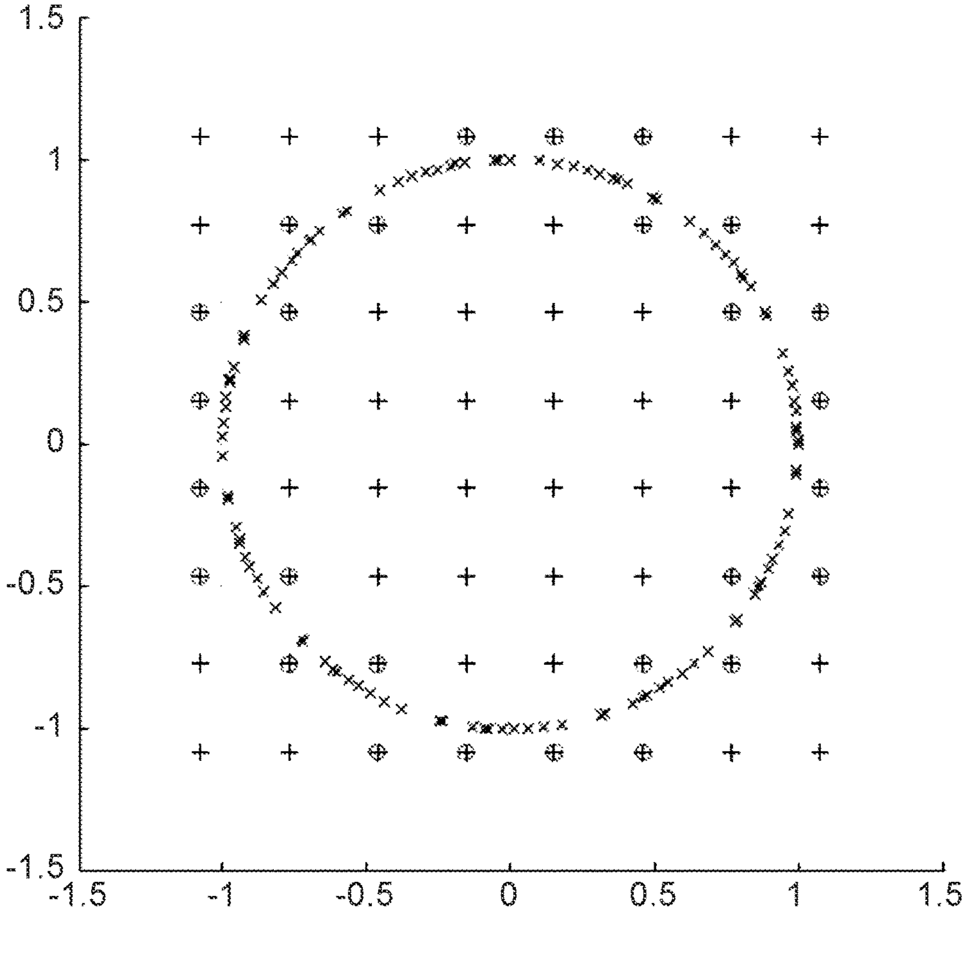
FIG. 3 illustrates the mapping of a Zadoff-Chu type sequence onto the constellation points associated with 64-QAM modulation.

Thus, if a Zadoff-Chu sequence of length Nzc=242 and index u=25 is considered, the complex symbols forming the sequence, represented by “x” on the constellation diagram associated with the 64-QAM modulation illustrated in FIG. 3 (where each point of the constellation is represented by a “+”), are mapped to the constellation points closest to the complex symbols. For example, if the complex symbols and constellation points are expressed in the form of 2D vectors, with an in-phase component and a quadrature-phase component, a complex symbol from the sequence is mapped onto the point of the constellation minimising the Euclidean distance with this symbol.

The constellation points thus selected are circled on the constellation diagram associated with the 64-QAM modulation illustrated in FIG. 3.

The selected constellation points can then be transmitted on different subcarriers, for example a selected constellation point per subcarrier.

In particular, the maximum length of the sequence is equal to the number of subcarriers of an OFDM symbol. Advantageously, the maximum length of the sequence is equal to the number of useful subcarriers of an OFDM symbol.

According to a particular embodiment, it is in particular possible to repeat the sequence over several OFDM symbols (preferably consecutive) so as to increase the probability of good detection on the access point side.

It is noted that, according to the example above, the Zadoff-Chu sequence of length Nzc=242 and index u=25 is used to encode a given power level. It can therefore be fed back by all stations associated with the same power level.

This step of mapping the complex symbols from the sequence onto a selection of constellation points can in particular be implemented in a mapping/interleaving module of a transmission chain of a multicarrier signal, for example of the OFDM type.

On the access point side, the reverse operation can be implemented by a de-mapping/de-interleaving module of a reception chain of a multicarrier signal, for example of the OFDM type.

In this manner, it is possible to reuse a portion of the conventional OFDM processing chain (for example, on the transmission side, channel coding type modules, frequency-time transformation, insertion of a guard interval, shaping of carriers, etc., and on the reception side of the modules of the guard interval suppression type, time-frequency transformation, channel decoding, etc.).

According to a second embodiment, called embodiment with “bitmap”, the information representative of a power level is a position-value pair (“bitmap”). The presence of a particular value at a given position in an uplink frame is associated with a power level. For example, the position-value pair is represented by a binary vector of size N having a single component equal to 1 and (N−1) components equal to 0, and a different vector is associated with each power level. Thus, if three power levels are considered as illustrated in FIG. 1, a first power level can be encoded by the vector (100), a second power level by the vector (010), a third power level by the vector (001). A table of correspondence between different vectors and different power levels can be known to the access point and the stations, or transmitted from the access point to the stations (for example in the downlink frame or in another frame).

For each uplink frame, the position-value pair encoding the power level associated with a station can be transmitted in the time domain. For example, the position of the position-value pair indicates a position in the uplink frame, and the value of the position-value pair indicates the value carried by the field at this position in the uplink frame.

Alternatively, the position-value pair encoding the power level associated with a station can be transmitted in the frequency domain. The pair encoding the power level associated with a station can then be transmitted on a selection of constellation points of the constellation diagram associated with the modulation used for the transmission of the uplink frame (for example 16-QAM, 64-QAM, etc.).

Taking into account the binary vector example above, a component equal to ‘0’ can be mapped onto a constellation point having a low amplitude negative in-phase component, and a component equal to ‘1’ can be mapped onto a constellation point having a high amplitude positive in-phase component.

Each constellation point may be transmitted on a distinct subcarrier.

For example, the position of the component equal to ‘1’ in the vector gives the index of the subcarrier transmitting the constellation point on which the component equal to ‘1’ of the binary vector is mapped.

Thus, it is possible to reserve certain useful subcarriers of an OFDM symbol which are uniformly distributed to transmit the constellation points on which the components of a vector representing a position-value pair are mapped. Using the example of the binary vector above, a single subcarrier, among the reserved subcarriers, can thus be assigned to '1' (the one corresponding to the desired power level) and all others to '0'.

Using the example of a vector of length N equal to 3, it is therefore possible to reserve N subcarriers uniformly distributed in the OFDM symbol to transmit the different components. For example, if an OFDM symbol formed of 242 useful carriers is considered, the carriers of index 48, 96 and 144 can be reserved respectively for the transmission of the first component, the second component, and the third component of the binary vector.

Thus, for the first power level encoded by the vector (100), corresponding to the position-value pair (1,1), the component '1' can be mapped onto a constellation point transmitted on the subcarrier of index 48, and the components '0' onto the constellation points transmitted on the subcarriers of index 96 and 144.

For the second power level encoded by the vector (010), corresponding to the position-value pair (2,1), the component '1' can be mapped onto a constellation point transmitted on the subcarrier of index 96, and the components '0' onto the constellation points transmitted on the subcarriers of index 48 and 144.

For the third power level encoded by the vector (001), corresponding to the position-value pair (3,1), the component '1' can be mapped onto a constellation point transmitted on the subcarrier of index 144, and the components '0' onto the constellation points transmitted on the subcarriers of index 48 and 96.

It is also possible to use the other subcarriers of the OFDM symbol to transmit random values, so as to preserve the properties of the OFDM symbol.

In particular, the maximum length of the vector (N) is small relative to the number of useful subcarriers of an OFDM symbol.

Again, the step of mapping the components of the vector onto a selection of constellation points can be implemented in a mapping/interleaving module of a transmission chain of a multicarrier signal, for example of the OFDM type. On the access point side, the reverse operation can be implemented by a de-mapping/de-interleaving module of a reception chain of a multicarrier signal, for example of the OFDM type. In this manner, it is possible to reuse a portion of the conventional OFDM processing chain.

In addition, it is possible to repeat the position-value pair, or the vector representing this pair, over several (preferably consecutive) OFDM symbols so as to increase the probability of good detection on the access point side.

It is also noted that the use of a high order modulation allows making the uplink frame more robust to collisions, because the constellation point associated with a component '0' can have a low amplitude.

Thus, when the access point receives one or more uplink frames from one or more stations, it can compare the values received on the different subcarriers with a given threshold. It is recalled that the position of the component equal to '1' in the vector allows identifying the subcarrier transmitting the constellation point onto which the component equal to '1' of the binary vector is mapped. The access point can thus determine the presence of a power level by comparing the values received on the corresponding subcarrier, with a given threshold.

In particular, such a threshold can be determined by taking into account the value of the position-value pair. For example, for a value equal to 1, the threshold can be 0.8 (to take into account a loss in the range of 20%).

Regardless of the considered embodiment, the information representative of the power level can be transmitted in the "preamble" portion of the uplink frame. In this manner, the access point has the power information very quickly. It is recalled for this purpose that if the downlink frame is a "Trigger" frame, the station transmits the uplink frame for a fixed time after receiving the "Trigger" frame, for example in the range of 16 μs.

A drawback of this implementation is that the stations must use the inter-carrier spacing defined in the versions prior to the IEEE 802.11ax standard (that is to say 312.5 kHz), which reduces the number of subcarriers per OFDM symbol, and therefore the length of the sequences or the bitmap. In addition, the use of an uplink OFDMA type access technique is not possible according to this implementation, because such a technique is only defined for the IEEE 802.11ax standard or the future versions.

Alternatively, regardless of the considered embodiment, the information representative of the power level can be transmitted in the "data" portion of the uplink frame. The information representative of the power level is then considered as the ("payload") data of the physical layer (PHY).

Such an implementation allows feeding back information representative of the power level using an IEEE 802.11ax frame format (or any more recent version). This allows in particular taking advantage of an inter-carrier spacing of 78.125 kHz and of the uplink OFDMA type access technique.

In particular, a power control mechanism on the OFDMA uplink, as defined in the IEEE 802.11ax standard, can be implemented, which allows ensuring that the uplink frames sent by the different stations in response to the downlink frame ("Trigger" frame for example) arrive with a substantially equivalent power at the access point.

For purely illustrative purposes, FIG. 4 shows an example of frames exchanged between the access point 11 and the stations STA1 121, STA2 122, STA3 123 and STA4 124 of the network illustrated in FIG. 1.

As already described, the access point AP 11 broadcasts a downlink frame to the station(s) present in the coverage area of the access point. For example, the downlink frame is a "Trigger" frame, requiring the transmission, by all stations receiving the "Trigger" frame, of a received power level of the access point.

On receiving the uplink frame, the first station STA1 121 estimates the power of the downlink frame as received by the first station, obtains a received signal strength indicator RSSI 1, and feeds back representative information of the indicator RSSI 1 to the access point 11. The second station STA2 122 also estimates the power of the downlink frame as received by the second station, obtains a received signal strength indicator RSSI 1, and also feeds back information representative of the indicator RSSI 1 to the access point 11. The third station STA3 123 estimates the power of the downlink frame as received by the third station, obtains a received signal strength indicator RSSI 2, and feeds back information representative of the indicator RSSI 2 to the access point 11. Finally, the fourth station STA4 124 estimates the power of the downlink frame as received by the fourth station, obtains a received signal strength indicator RSSI 4, and feeds back information representative of the indicator RSSI 4 to the access point 11.

According to the illustrated example, the first and second stations STA1 121 and STA2 122 use the same information representative of a power level, for example the same sequence or the same bitmap, since they are located at the same distance from the access point 11.

5.4 Example of Implementation

An example of implementation of the invention is presented below, based on the use of a family of sequences comprising a reference sequence and shifted versions of the reference sequence for encoding the power levels, and on the use of a "Trigger" frame with a particular identifier for the downlink frame.

The access point sends a "Trigger" frame by putting the particular identifier in the AID field, and by providing power control information for the uplink frames according to the OFDMA access technique to be sent back by the stations (according to the conventional method described in the IEEE 802.11ax standard).

Each station within range of the access point (i.e. located in the coverage area of the access point) receiving this "Trigger" frame:

- decodes the "Trigger" frame,
- detects that it must feed back its received power level thanks to the presence of the identifier in the "Trigger" frame,
- uses the power received from the "Trigger" frame to determine the shift to be applied to the reference sequence (assumed to be known to the access point and the stations, or whose properties have been previously signalled) based on a correspondence table (assumed to be known to the access point and the stations or previously communicated),
- possibly selects constellation points associated with the modulation to be used for the transmission to transmit the shifted sequence (for example 64-QAM, assumed to be preconfigured, signalled, or selected on the fly depending on the link budget) and possibly repeats this shifted sequence over several consecutive OFDM symbols (repetition also assumed signalled),
- sends the selected constellation points (i.e. the data symbols thus constructed) via a frequency-time transformation etc., after sending the preamble according to the IEEE 802.11ax standard and, according to the upstream sending process (UL: Uplink) OFDMA, a fixed time after reception of the "Trigger" frame (for example in the range of 16 μs).

The access point therefore receives uplink frames from the different stations present in its coverage area, the different uplink frames being able to be superimposed.

After the conventional steps of receiving the preamble, the access point:

- obtains the symbols corresponding to the shifted sequence, at the output of a time-frequency transformation module,
- applies a sliding correlation with the known reference sequence of the access point,
- identifies the correlation peaks around the expected shifts and compares them to a threshold,
- establishes a map of the power levels received via the correspondence table.

The access point can then adjust its transmission power level thanks to this map. It can also take into account other criteria to adjust its power level.

5.5 Variants

Different variants or options can be implemented.

For example, a possible optimisation consists in reducing the number of power levels to be identified, in order to gain in reactivity, complexity and/or power consumption. The list of the sequences or bitmap could thus be restricted to the lowest powers (that is to say the most distant stations and therefore the most impacted by a reduction in the transmission power of the access point).

Another optimisation consists in notifying a restricted list of the sequences or bitmaps to be used in the downlink frame (that is to say decrease the granularity of the return).

A possible variant consists in forming groups per band (or per resource unit RU) instead of allocating the entire band to all stations (a single virtual user). Indeed, the access technique UL OFDMA allows in particular scheduling the stations by group. The stations which can be grouped can be identified in the "Trigger" frame sent by the access point to notify the allocation and serve as a synchronisation frame. The stations belonging to the same group can then feed back simultaneously the information representative of their indicator RSSI in resource units. This information feedback by group allows in particular compressing the feedback time.

Such a variant is based on the constitution of groups of stations. For example, each station determines to which group it belongs depending on the estimated power. According to another example, the stations associated with the access point belong to a first group, and the stations which are not yet associated with the access point belong to a second group.

In particular, certain variants, such as the reservation of a sub-band for certain stations or the limitation of the number of power levels, may require the transmission of additional information in the downlink frame, intended to be used to generate the uplink frames.

Moreover, different embodiments have been described, according to which one sequence or one bitmap is used per power level, without distinction of BSS. In the case where several access points are present, each access point being associated with a BSS, it is possible to allocate a family of sequences per BSS, or a set of vectors per BSS. Thus, the risk of collision between the procedures initiated by the different access points is reduced.

For example, it is possible to define a family of sequences by BSS colour. A short range (with a maximum of 64 different colours for the IEEE 802.11ax standard) and the existing mechanisms for managing colour collisions make a good selection criterion for the families of sequences. In addition, if the families of sequences are orthogonal, the state of the close neighbourhood (in particular in terms of power) can be obtained by an access point having received uplink frames intended for a neighbouring access point.

It is noted that this variant is of little interest for an implementation according to the IEEE 802.11ax standard, since the BSS colour information is already present in the header of the "Trigger" frame. The same family could therefore be used without risk of confusing the BSSs, and it is not necessary to have families of different sequences.

According to yet another variant, a station can be used to relay uplink frames that it would have received, from at least one other station. In particular, if the information representative of the power level is transmitted in the frequency domain, the station receiving the uplink frame can demodulate it and relay the corresponding bits/symbols (if it manages to identify the frame type). The access point receiving the relayed uplink frame can then post-process these bits/symbols by doing the reverse path.

According to another variant, the sending of a downlink frame by the access point can be implemented periodically at nominal power (not reduced) so that the stations in hibernation do not lose coverage definitively, or even so that stations coming within the nominal range of the BSS can be included therein.

The sending of a downlink frame by the access point can also be implemented at reduced power, in particular following the analysis of the environment resulting from a previous collection phase (sending a downlink frame and receiving the associated uplink frames).

In particular, the downlink frame can be broadcast periodically or following a triggering event such as the sending of beacons by the access point, the association of at least one new station with the access point, the detection of a neighbouring access point, the detection of the mobility of at least one station, etc. Indeed, since the stations are mobile and the environment changes over time (new stations may come in the access point's coverage area and wish to be associated, for example), it is desirable to regularly collect power information. In particular, the fact of performing certain occurrences of this procedure just after sending the beacons allows ensuring that a maximum number of stations are active. Indeed, the stations on standby wake up regularly, in particular to listen to the essential information transmitted in certain beacons.

5.6 Devices

Figure 5:
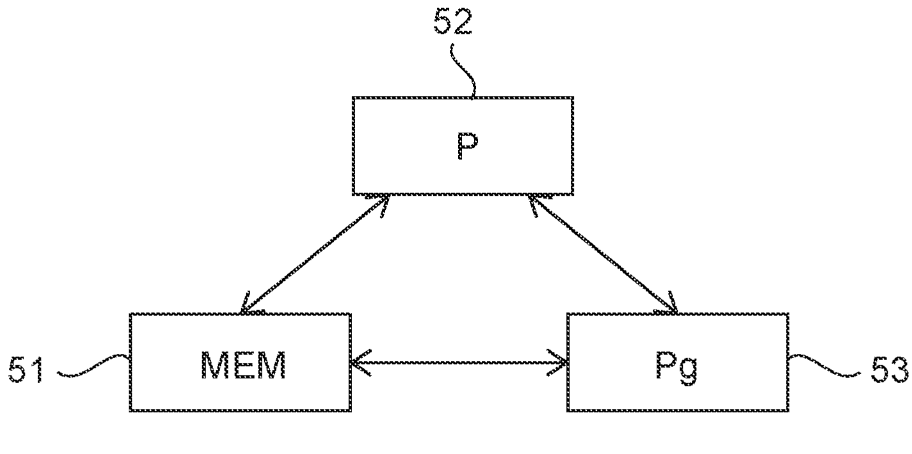
FIG. 5 shows the simplified structure of an access point implementing a method for managing a wireless access point according to one embodiment of the invention.
Figure 6:
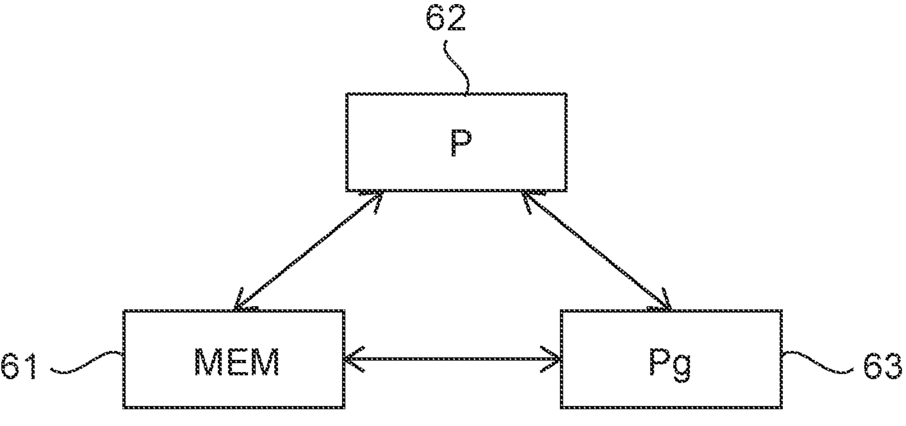
FIG. 6 shows the simplified structure of a station implementing a data transmission method between a station and an access point according to one embodiment of the invention.

Finally, in relation to FIGS. 5 and 6, the simplified structures of an access point and of a station according to at least one embodiment described above are shown.

As illustrated in FIG. 5, an access point comprises at least one memory 51 comprising a buffer memory, and at least one processing unit 52, equipped for example with a programmable calculation machine or a dedicated calculation machine, for example a processor P, and driven by the computer program 53, implementing steps of the method for managing a wireless access point according to at least one embodiment of the invention.

On initialisation, the code instructions of the computer program 53 are for example loaded into a RAM memory before being executed by the processor of the processing unit 52.

The processor of the processing unit 52 implements steps of the previously described management method, according to the instructions of the computer program 53, to:

- broadcast a downlink frame to the station(s) present in the coverage area of the access point, said downlink frame carrying an indicator requiring the transmission, by a station receiving said downlink frame, of received a power level of the access point,
- receive at least one uplink frame from at least one of said stations, in response to said downlink frame, an uplink frame transmitted by a station carrying information representative of the power level of the access point received by said station,
- determine at least one power level of the access point received by at least one of said stations, based on said information representative of the power level carried by said uplink frame(s).

As illustrated in FIG. 6, a station comprises at least one memory 61 comprising a buffer memory, and at least one processing unit 62, equipped for example with a programmable calculation machine or a dedicated calculation machine, for example a processor P, and driven by the computer program 63, implementing steps of the method for transmitting data from a station to an access point according to at least one embodiment of the invention.

On initialisation, the code instructions of the computer program 63 are for example loaded into a RAM memory before being executed by the processor of the processing unit 62.

The processor of the processing unit 62 implements steps of the previously described data transmission method, according to the instructions of the computer program 63, to:

- receive a downlink frame from said access point,
- detect, in said downlink frame, an indicator requiring the transmission of the power level of the access point received by said station,
- estimate the power of said downlink frame received by said station,
- transmit, to said access point, an uplink frame carrying information representative of a power level associated with the estimated power.

The invention claimed is:

1. A method for managing a wireless access point, comprising:

broadcasting, to stations present in a coverage area of the access point, a downlink frame, said downlink frame carrying an indicator requiring transmission, by the stations receiving said downlink frame, of a power level of the downlink frame as received by the stations, receiving simultaneously or with a slight shift at least two uplink frames thereby colliding, said at least two uplink frames being transmitted respectively from at least two stations that received the downlink frame, in response to said downlink frame, each of the at least two uplink frames transmitted from each station of the at least two stations carrying information which is representative of and encodes the power level of the downlink frame as received and estimated by the respective station of the at least two stations, and determining at least one power level of the downlink frame as received by the at least two stations, based on said information carried by the at least two uplink frames, wherein said information which is representative of and encodes the power level of the downlink frame as received and estimated by the respective station of the at least two stations is:

a sequence of a family of at least one sequence known to said access point, each sequence of said family being a sequence of complex symbols and being associated with a distinct power level, or a position-value pair of a set of at least one position-value pair known to said access point, each position-value pair of said set being associated with a distinct power level.

2. The method according to claim 1, wherein said downlink frame is an uplink resource allocation frame.

3. The method according to claim 1, wherein said determining implements, for at least one sequence of the family of at least one sequence known to said access point, a correlation between said sequence and said at least two uplink frames.

4. The method according to claim 1, wherein said determining implements, for at least one position-value pair of the set of at least one position-value pair known to said access point:

obtaining a value associated with the position of said position-value pair in said at least two uplink frames, and comparing said obtained value with a determined threshold.

5. The method according to claim 1, wherein said downlink frame carries at least one information item belonging to the group consisting of:

a maximum power, below which the at least two stations must feed back the at least two uplink frames to the access point, a family of at least one sequence to be used by the at least two stations to feed back the at least two uplink frames, a number of authorised cyclic shifts for a sequence to be used by the at least two stations to feed back the at least to uplink frames, a set of at least one position-value pair to be used by the at least two stations to feed back the at least two uplink frames.

6. The method according to claim 1, wherein the method comprises updating a transmission power of said access point taking into account said determination.

7. The method according to claim 1, wherein said downlink frame is broadcast periodically or following a triggering event belonging to the group consisting of:

sending at least one beacon by the access point, associating at least one new station with said access point, detecting a neighbouring access point, detecting a mobility of at least one station of the stations present in a coverage area of the access point.

8. The method according to claim 1, comprising associating said power level with said information which is representative of and encodes said power level in a table of correspondence previously known to the access point and the at least two stations or transmitted by the access point to the at least two stations in the downlink frame or in another frame.

9. A method for transmitting data from a station to a wireless access point, comprising:

receiving, by said station, a downlink frame from said access point, detecting, in said downlink frame, an indicator requiring transmission of a power level of the downlink frame as received by said station, estimating the power level of said downlink frame as received by said station, and transmitting, to said access point, a first uplink frame carrying information which is representative of and encodes the estimated power level simultaneously or with a slight shift to a transmission by another station of second uplink frame, said first and second uplink frames colliding, and each of said first and second uplink frames carrying information which is representative of and encodes said power level of said downlink frame received and estimated by the respective station, wherein said information which is representative of and encodes said power level received and estimated by the respective station is:

a sequence of a family of at least one sequence known to said access point, each sequence of said family being a sequence of complex symbols and being associated with a distinct power level, or a position-value pair of a set of at least one position-value pair known to said access point, each position-value pair of said set being associated with a distinct power level.

10. The method according to claim 9, wherein said information representative of the power level is the sequence of the family of at least one sequence known to said access point, each sequence of said family being associated with the distinct power level.

11. The method according to claim 9, wherein said information representative of the power level is the position-value pair of the set of at least one position-value pair known to said access point, each position-value pair of said set being associated with the distinct power level.

12. The method according to claim 9, wherein said information representative of the power level is repeated over several consecutive Orthogonal Frequency Division Multiple Access (OFDM) symbols.

13. The method according to claim 9, wherein said first uplink frame is transmitted on a resource shared by the other station transmitting the same information representative of said power level.

14. A wireless access point capable of communicating with at least one station, the wireless access point comprising:

at least one processor; and at least one non-transitory computer readable medium comprising instructions stored thereon which when executed by the at least one processor configure the wireless access point to:

broadcast a downlink frame to stations present in a coverage area of the access point, said downlink frame carrying an indicator requiring transmission, by the stations receiving said downlink frame, of a power level of the downlink frame as received by the stations, receive simultaneously or with a slight shift thereby colliding, said at least two uplink frames being transmitted respectively from at least two stations that received the downlink frame, in response to said downlink frame, each of the at least two uplink frames transmitted from a station of the at least two station carrying information which is representative of and encodes the power level of the downlink frame as received and estimated by this respective station of the at least two stations, and determine at least one power level of the downlink frame as received by the at least two stations, based on said information carried by the at least two uplink frames, wherein said information which is representative of and encodes said power level as received and estimated by this respective station of the at least two stations is:

a sequence of a family of at least one sequence known to said access point, each sequence of said family being a sequence of complex symbols and being associated with a distinct power level, or a position-value pair of a set of at least one position-value pair known to said access point, each position-value pair of said set being associated with a distinct power level.

15. A station capable of communicating with a wireless access point, the station comprising:

at least one processor; and at least one non-transitory computer readable medium comprising instructions stored thereon which when executed by the at least one processor configure the station to:

receive a downlink frame from said access point, detect, in said downlink frame, an indicator requiring transmission of a power level of the downlink frame as received by said station, estimate the power level of said downlink frame as received by said station, and transmit, to said access point, a first uplink frame carrying information which is representative of and encodes the estimated power level simultaneously or with a slight shift to a transmission by another station of second uplink frame, said first and second uplink frames colliding, and each of said first and second uplink frames carrying information which is representative of and encodes said power level associated with the estimated power level of said downlink frame received by the respective station, wherein said information which is representative and encodes said power level associated with the estimated power level of said downlink frame received by the respective station is:

a sequence of a family of at least one sequence known to said access point, each sequence of said family being a sequence of complex symbols and being associated with a distinct power level, or a position-value pair of a set of at least one position-value pair known to said access point, each position-value pair of said set being associated with a distinct power level.

* * * * *